July 21, 1964    H. A. LUDEWIG ETAL    3,141,491
SOLID TIRE AND MOLD FOR MAKING SAME
Filed Aug. 14, 1961
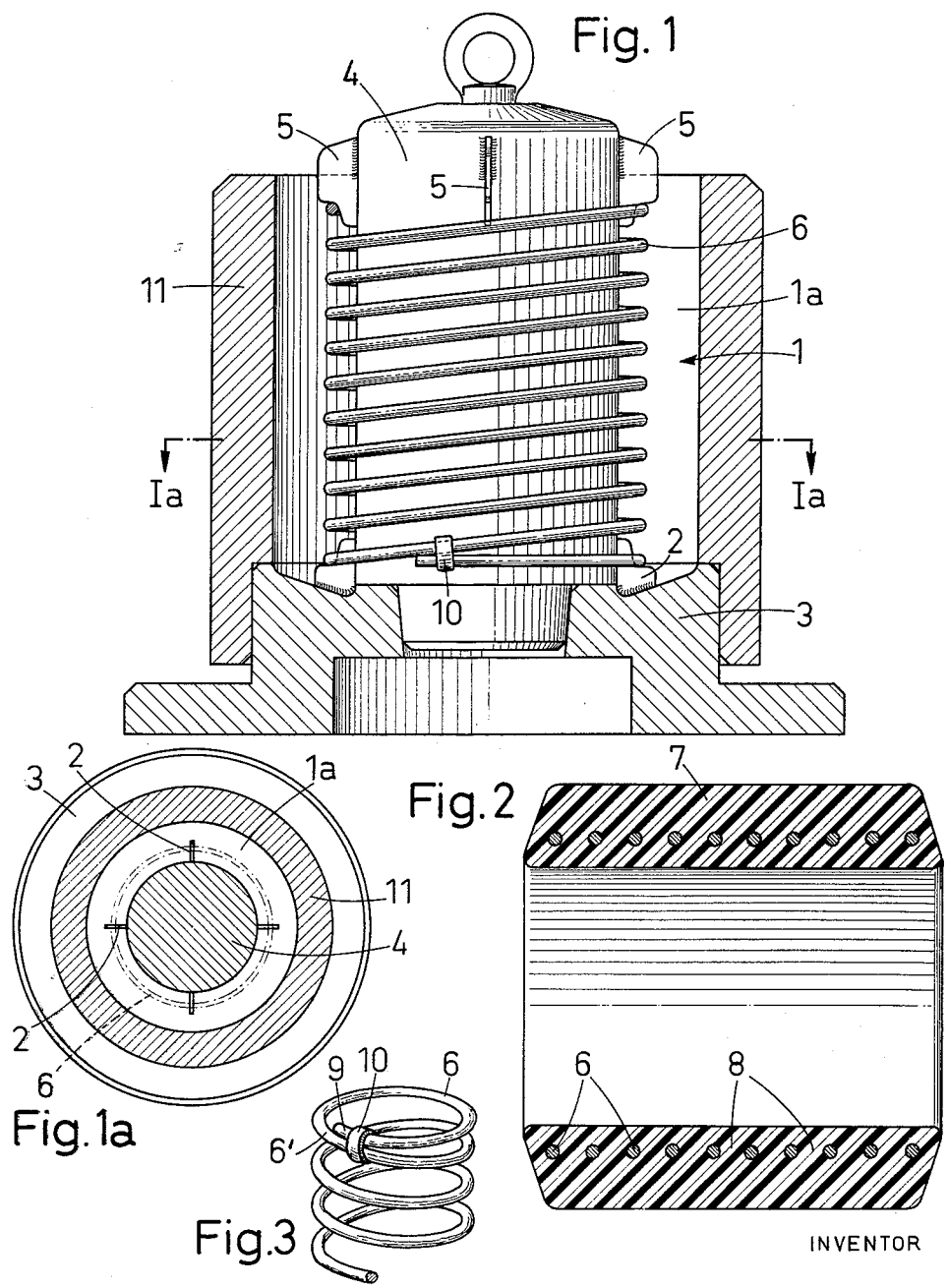
INVENTOR
BY
his ATTORNEY

United States Patent Office 3,141,491
Patented July 21, 1964

3,141,491
SOLID TIRE AND MOLD FOR MAKING SAME
Heinz Adolf Ludewig and Fritz Koch, Hannover, Germany, assignors to Continental Gummi-Werke Aktiengesellschaft, Hannover, Germany
Filed Aug. 14, 1961, Ser. No. 131,234
Claims priority, application Germany Aug. 16, 1960
1 Claim. (Cl. 152—323)

The present invention relates to a solid tire of elastic pourable material for vehicle wheels, friction wheels, wheels for caterpillar tracks, etc., with an annular pull-resistant reinforcing insert.

The invention also comprises a casting mold for making elastic tires of the above mentioned type.

It is an object of the present invention to provide a solid tire of the above mentioned character, which will make it possible easily to mount the tire on the wheel body while assuring a firm fit of the tire on said wheel body.

It is another object of this invention to provide a mold for making a tire as set forth in the preceding paragraph, which will permit a simple and precise placement of the reinforcing insert in the mold when the tire body is to be cast.

These and other objects and advantages of the invention will appear more clearly from the following specification in connection with the accompanying drawing, in which:

FIG. 1 is a section through a casting mold according to the invention for an elastic tire with a reinforcing insert according to the invention.

FIG. 1a is a section along the line Ia—Ia of FIG. 1 but on a smaller scale than FIG. 1.

FIG. 2 is a section through a solid tire produced by means of a mold according to FIG. 1.

FIG. 3 represents a detail of the reinforcing insert employed in conformity with the present invention.

According to the present invention, the reinforcing insert is shaped in the manner of a helical spring so that the windings of the insert are arranged in spaced relationship from each other. Furthermore, the reinforcing insert is so designed that it is self-supporting or forms a free-supporting insert when not yet embedded in the pourable material. This reinforcing insert which preferably is made of steel wire or the like has the advantage that the tire can easily be mounted on the wheel body or the like by slightly expanding its reinforcing insert so that a safe connection of the tire body to the wheel body will be assured. The design of the reinforcing insert as self-supporting helix or coil coaxial to the tire body and extending from one side to the other side of the tire body yields the possibility of fixing the reinforcing insert in the mold in a simple and safe manner when the tire body is to be cast.

Referring now to the drawing in detail and FIG. 1 thereof in particular, the mold 1 shown therein, which may be of a construction corresponding to the shape of the tire to be cast, has near the bottom of the mold chamber 1a two or more protrusions 2 distributed over the circumference of chamber 1a and having a relatively thin wall thickness. These protrusions 2 are preferably connected to the bottom 3 of the mold. In the upper portion of the mold chamber 1a, the core 4 of the mold is provided with protrusions 5 which are similarly arranged and designed as the protrusions 2. The self-supporting or free-supporting reinforcing insert 6 for the tire body 7 to be produced is held between the protrusions 2 and 5. At the same time, the reinforcing insert 6 is centered by the protrusions 2 and 5 with regard to the mold chamber 1a and core 4.

The reinforcing insert consists of a steel wire coiled in the manner of a cylindrical coil spring in such a way that the individual windings are relatively widely spaced from each other as has been illustrated at 8 in FIG. 2. Due to the spacing between the windings, a bubble-free cast will be assured. Moreover, it will be assured that the castable material which is filled into chamber 1a will envelope the entire reinforcing insert. Preferably, also the winding diameter will be so selected that the same exceeds the inner diameter of the tire by only approximately 5 millimeters.

For a better support and centering of the reinforcing insert 6, the ends 9 of the helix are fixedly connected by means of clamp 10 or the like to the adjacent winding 6'.

After the casting operation has been completed and the elastic material preferably polyurethane has solidified, the tire is removed from the mold of FIG. 1 by lifting off the outer mold ring 11 and pulling off the tire body from the core 4. The tire body will then have a cross section as shown in FIG. 2.

It may be mentioned that instead of the reinforcing insert according to the drawing, also two or more telescopically inter-engaged reinforcing inserts may be employed. It is also possible to employ one or more reinforcing inserts 6 which differ in shape from a cylindrical shape, as for instance reinforcing inserts in the manner of two superimposed truncated cone-shaped springs or the like, when the inner surface of the tire is to be designed conically or of a double cone shape. However, also in this instance the reinforcing insert is to be designed as free supporting and is to be provided with windings spaced from each other in axial direction of the spring.

It is, of course, to be understood that the present invention is, by no means, limited to the particular construction shown in the drawing but also comprises any modifications within the scope of the appended claim.

What we claim is:

A solid tire for vehicle wheels, friction wheels, wheels for caterpillar tracks and other wheels, which includes a body portion of solidified castable material and a helical spring shaped self-supporting reinforcing wire insert extending axially in the body portion of said tire and having its windings all of the same diameter and spaced from each other in axial direction of said tire, said insert being coaxial with said tire, the windings of said reinforcing insert being embedded in the body portion of said tire and the ends of the insert being near the ends of the tire, and clamping means respectively clamping each free end of said helical wire insert against the next adjacent winding of said reinforcing wire insert.

References Cited in the file of this patent

UNITED STATES PATENTS

| | | |
|---|---|---|
| 352,812 | Eickemeyer | Nov. 16, 1886 |
| 1,032,454 | Wainwright | July 16, 1912 |
| 2,415,765 | Schmidt | Feb. 11, 1947 |
| 2,684,503 | Silver | July 27, 1954 |
| 2,726,923 | Schleich | Dec. 13, 1955 |
| 2,764,213 | Simpson | Sept. 25, 1956 |
| 2,818,249 | Boschi | Dec. 31, 1957 |
| 2,906,312 | Freedlander | Sept. 29, 1959 |
| 2,924,850 | Schultz | Feb. 16, 1960 |
| 2,925,623 | Beckadolph | Feb. 23, 1960 |
| 2,934,792 | Harrington | May 30, 1960 |
| 3,069,701 | McInerney | Dec. 25, 1962 |